US012692615B2

(12) United States Patent
Lee et al.

(10) Patent No.: US 12,692,615 B2
(45) Date of Patent: Jul. 28, 2026

(54) HOME APPLIANCE INCLUDING HAIRLINE AND MANUFACTURING METHOD THEREOF

(71) Applicant: SAMSUNG ELECTRONICS CO., LTD., Suwon-si (KR)

(72) Inventors: Kyung Hwan Lee, Suwon-si (KR); Ji Young Song, Suwon-si (KR); Kwang Joo Kim, Suwon-si (KR); In Hye Hwang, Suwon-si (KR); Jong Su Oh, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 301 days.

(21) Appl. No.: 18/086,384

(22) Filed: Dec. 21, 2022

(65) Prior Publication Data

US 2023/0124298 A1 Apr. 20, 2023

Related U.S. Application Data

(62) Division of application No. 17/043,865, filed as application No. PCT/KR2018/013656 on Nov. 9, 2018, now abandoned.

(30) Foreign Application Priority Data

Apr. 2, 2018 (KR) ........................ 10-2018-0038374

(51) Int. Cl.
*C25D 5/12* (2006.01)
*B05D 7/16* (2006.01)
(Continued)

(52) U.S. Cl.
CPC ................. *C25D 5/12* (2013.01); *B05D 7/16* (2013.01); *B32B 15/01* (2013.01); *C25D 5/14* (2013.01);
(Continued)

(58) Field of Classification Search
CPC ... C25D 5/12; C25D 5/14; C25D 5/48; B05D 7/16; B05D 3/12; B05D 5/08;
(Continued)

(56) References Cited

U.S. PATENT DOCUMENTS 3,009,238 A 11/1961 Knapp
2012/0045954 A1 2/2012 Bleecher

FOREIGN PATENT DOCUMENTS

JP 2013-166225 8/2013
KR 10-2010-0018880 A 2/2010
(Continued)

OTHER PUBLICATIONS

English machine translation of KR-20150062617.*
(Continued)

*Primary Examiner* — Robert S Walters, Jr.
(74) *Attorney, Agent, or Firm* — STAAS & HALSEY LLP

(57) ABSTRACT

A manufacturing method of a home appliance including a hairline according to disclosed embodiment includes forming at least one plating layer on the base material, processing
(Continued)

the transverse hairline on the upper surface of the plating layer by tilting the hairline processing wheel at a predetermined angle, and forming a coating layer on the hairline.

6 Claims, 5 Drawing Sheets

(51) Int. Cl.

| | | |
|---|---|---|
| *B32B 15/01* | (2006.01) | |
| *C25D 5/14* | (2006.01) | |
| *C25D 5/48* | (2006.01) | |
| *B05D 3/12* | (2006.01) | |
| *B05D 5/08* | (2006.01) | |
| *C23C 30/00* | (2006.01) | |

(52) U.S. Cl.
CPC .................. *C25D 5/48* (2013.01); *B05D 3/12* (2013.01); *B05D 5/08* (2013.01); *B05D 2202/25* (2013.01); *B05D 2350/65* (2013.01); *C23C 30/00* (2013.01); *Y10T 428/1275* (2015.01); *Y10T 428/12854* (2015.01); *Y10T 428/1291* (2015.01)

(58) Field of Classification Search
CPC ............ B05D 2202/25; B05D 2350/65; B32B 15/01; Y10T 428/1275; Y10T 428/12854; Y10T 428/1291; C23C 30/00
See application file for complete search history.

(56) References Cited

FOREIGN PATENT DOCUMENTS

| | | | |
|---|---|---|---|
| KR | 10-1020635 | 3/2011 | |
| KR | 101020635 B1 * | 3/2011 | |
| KR | 10-1510555 B1 | 4/2015 | |
| KR | 10-2015-0062617 | 6/2015 | |
| KR | 20150062617 A * | 6/2015 | |
| KR | 10-1568480 | 11/2015 | |
| KR | 10-2015-0134194 | 12/2015 | |
| WO | WO-2018013863 A1 | 1/2018 | |
| WO | WO-2019059660 A1 * | 3/2019 | .............. C21D 8/02 |

OTHER PUBLICATIONS

English machine translation of KR 101020635.*
Office Action dated Mar. 30, 2023 issue in Korean Application No. 10-2018-0038374.
International Search Report dated Mar. 8, 2019 from International Application No. PCT/KR2018/013656, 7 pages.
Office Action dated Aug. 29, 2022 issued in Korean Application No. 10-2018-0038374.
Office Action dated Nov. 26, 2021 issued in the U.S. Appl. No. 17/043,865.
Office Action dated Apr. 26, 2022 issued in the U.S. Appl. No. 17/043,865.
Office Action dated Sep. 21, 2022 issued in U.S. Appl. No. 17/043,865.
Advisory Action dated Dec. 2, 20222 issued in U.S. Appl. No. 17/043,865.

* cited by examiner

1 start

S310 form at least one plating layer on
base material

S320 process transverse hairline on upper
surface of plating layer by tilting
hairline processing wheel at
predetermined angle

S330 form a coating layer on hairline end

HOME APPLIANCE INCLUDING HAIRLINE AND MANUFACTURING METHOD THEREOF

CROSS-REFERENCE TO RELATED APPLICATIONS

This application is a divisional application of U.S. patent application Ser. No. 17/043,865 filed on Sep. 30, 2022, which is a National Stage Application filed under 35 U.S.C. § 371 of PCT International Patent Application No. PCT/KR2018/013656 filed Nov. 9, 2018, which claims the priority benefit of Korean Patent Application No. 10-2018-0038374 filed on Apr. 2, 2018, in the Korean Intellectual Property Office, the disclosures of which are incorporated herein by reference.

BACKGROUND

Field

The present disclosure relates to a home appliance including a hairline and a manufacturing method thereof, and more particularly, to a home appliance including a hairline with improved anti-fingerprint properties, and a manufacturing method thereof.

Description of Related Art

Recently, in order to show the luxury and cleanliness of home appliance, the front surface of home appliance is plated with chrome and coated. However, over time, fingerprints may be attached to the surface of the home appliance due to user contact. In particular, in the case of hairline-processed home appliances, the users fingerprints tend to be more prominent, and the sense of luxury or cleanliness of the home appliance may be damaged.

In addition, conventionally, in the surface processing of a home appliance, primary chromium (Cr) plating was performed, hairline processing was performed, and secondary chromium plating was performed, followed by coating. In this case, since the plating process has to be performed twice, there is a problem in that productivity is lowered and material cost is increased. In addition, after coating, there is a problem of high color difference in fingerprint visibility and fingerprint wipeability before and after fingerprint is applied.

SUMMARY

Therefore, it is an aspect of the disclosure to provide a home appliance including a hairline with improved corrosion resistance and anti-fingerprint properties, and a manufacturing method thereof.

In accordance with one aspect of the disclosure, a manufacturing method of a home appliance including a hairline, the manufacturing method includes: forming at least one plating layer on the base material; processing the transverse hairline on the upper surface of the plating layer by tilting the hairline processing wheel at a predetermined angle; and forming a coating layer on the hairline.

The tilting angle of the hairline processing wheel may be 4° to 10°

The pressure applied to the plating layer during the hairline processing may be 1 to 1.40 A.

The forming the plating layer may include: forming a copper plating layer by plating copper (Cu) on the base material, forming a nickel plating layer by plating nickel (Ni) on the copper plating layer and forming a chromium plating layer by plating chromium (Cr) on the nickel plating layer.

The forming the plating layer may include: plating the copper plating layer to 5 to 30 μm, plating the nickel plating layer to 5 to 30 μm on the upper surface of the copper plating layer and plating the chromium plating layer to 0.30 to 0.80 μm on the upper surface of the nickel plating layer.

The chromium layer may be processed to be worn by 0.08 to 0.20 μm during the hairline processing.

The base material may be aluminum (Al).

The coating layer may be coated using one of acrylic, fluorine, and silane-based paints.

The hairline may be formed to form an angle of 87° to 93° with respect to the vertical line.

In accordance with another aspect of the disclosure, a home appliance including a hairline, the home appliance includes: a copper (Cu) plating layer formed on an aluminum (Al) base material; a nickel (Ni) plating layer formed on the copper plating layer; and a chromium (Cr) plating layer formed on the nickel plating layer and having unevenness formed on an upper surface thereof in a transverse direction.

The unevenness may be formed to form an angle of 87° to 93° with respect to the vertical line.

The thickness of the chromium plating layer may be 0.15 to 0.5 μm.

The thickness of the copper plating layer may be 5 to 30 μm, the thickness of the nickel plating layer may be 5 to 30 μm.

The home appliance may further include: a coating layer formed on the chromium plating layer.

The coating layer may be one of acrylic, fluorine, and silane-based paints.

According to the home appliance including the hairline and the manufacturing method thereof according to the disclosed embodiment, a separate plating may not be performed after the hairline processing.

In addition, it is possible to manufacture a transverse hairline. In addition, it is possible to supplement fingerprint visibility and fingerprint wipeability.

DETAILED DESCRIPTION

Hereinafter, embodiments of the present disclosure will be described in detail with reference to the accompanying drawings.

Figure 1:
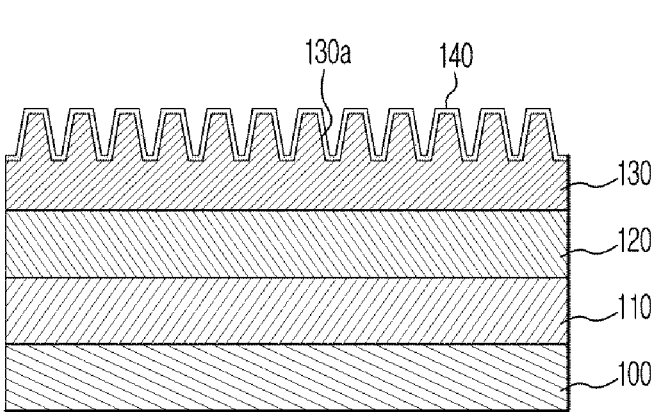
FIG. 1 is a view illustrating a state in which a plating layer is formed, a hairline is processed, and a coating layer is formed on a base material of a home appliance including a hairline according to an embodiment of the present disclosure.

FIG. 1 is a view illustrating a state in which a plating layer is formed, a hairline is processed, and a coating layer is formed on a base material of a home appliance including a hairline according to an embodiment of the present disclosure.

As shown in FIG. 1, a copper (Cu) plating layer 110 is formed on the upper surface of the base material 100 of the home appliance 1 according to the disclosed embodiment. In addition, a nickel (Ni) plating layer 120 is formed on the copper plating layer 110. A chromium (Cr) plating layer 130 is formed on the nickel plating layer 120. An aluminum (Al) may be used as the base material 100. An unevenness 130*a* forming a pattern in the transverse direction is formed on the upper surface of the chromium plating layer 130. The unevenness 130*a* may be formed by hairline processing. Here, the transverse direction means the horizontal direction. More specifically, the transverse direction means that the hairline is formed horizontally with the short side of the base material 100. The formation of hairline will be described later. A coating layer 140 may be formed on the upper surface of the chromium plating layer 130. The coating layer 140 may be formed using one of acrylic, fluorine, and silane-based paints.

That is, the copper plating layer 110, the nickel plating layer 120, and the chromium plating layer 130 may be formed from the base material 100 in order. An unevenness 130*a* is formed on the upper surface of the chromium plating layer 130, and a coating layer 140 may be disposed on the upper surface of the chromium plating layer 130.

The thickness of aluminum, which is the base material 100, may be 10 to 30 mm. The base material 100 may be manufactured using an extrusion technique. The thickness of the copper plating layer 110 may be 5 to 30 μm. The thickness of the nickel plating layer 120 may be 5 to 30 μm. The thickness of the chromium plating layer 130 may be 0.15 to 0.5 μm. This means the thickness of the chrome plating layer after hairline processing, and it means the maximum thickness of the chrome plating layer. The thickness of the chromium plating layer before hairline processing may be 0.3 to 0.8 μm. This will be described in more detail in Examples to be described later.

Figure 2:
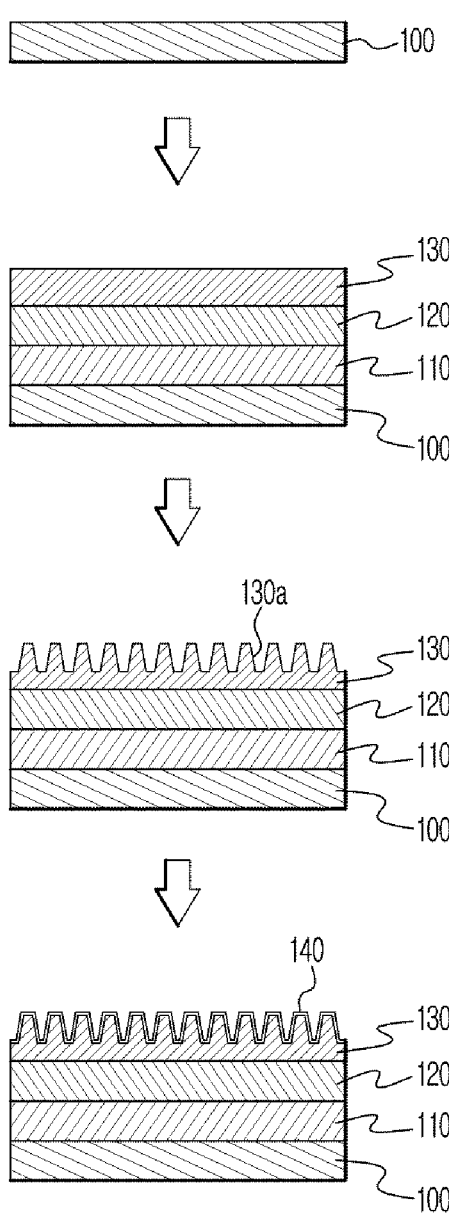
FIG. 2 is a view illustrating a manufacturing process of a home appliance including a hairline according to an embodiment of the present disclosure.

FIG. 2 is a view illustrating a manufacturing process of a home appliance according to an embodiment of the present disclosure.

As shown in FIG. 2, the home appliance 1 is formed by forming at least one plating layer 110, 120, 130 on the base material 100, processing the hairline 130*a* which is unevenness in the transverse direction on the upper surface of the plating layers 110, 120, 130 and forming a coating layer 140 on the hairline 130*a*. The coating layer may be coated using a silane-based, fluorine-based or acrylic-based paint. According to the disclosed embodiment, it may be coated using a silane-based cycloalkoxy alkyl silane. Cycloalkoxy alkyl silane is $(R_1O)_3$—$(CH)_n$—COONH—$(CH_2)_2$—COO—$CR_2$—$CH_2$, where n is 2 to 12, $R_1$ includes at least one of an alkoxy group, a cycloalchoxy group, and an alkyl group, $R_2$ includes at least one of a hydrogen group (—H), a methyl group (—$CH_4$), and a vinyl group (—CH=$CH_2$).

Plating is performed on the upper surface of the base material 100 in the order of a copper plating layer 110, a nickel plating layer 120, and a chrome plating layer 130.

Thereafter, the hairline is processed on the upper surface of the chrome plating layer 130 to form the unevenness 130*a*. Thereafter, the coating is performed to coat the upper surface of the unevenness 130*a* so that the coating layer 140 is formed.

Hereinafter, the hairline processing of the disclosed embodiment will be described.

Figure 3:
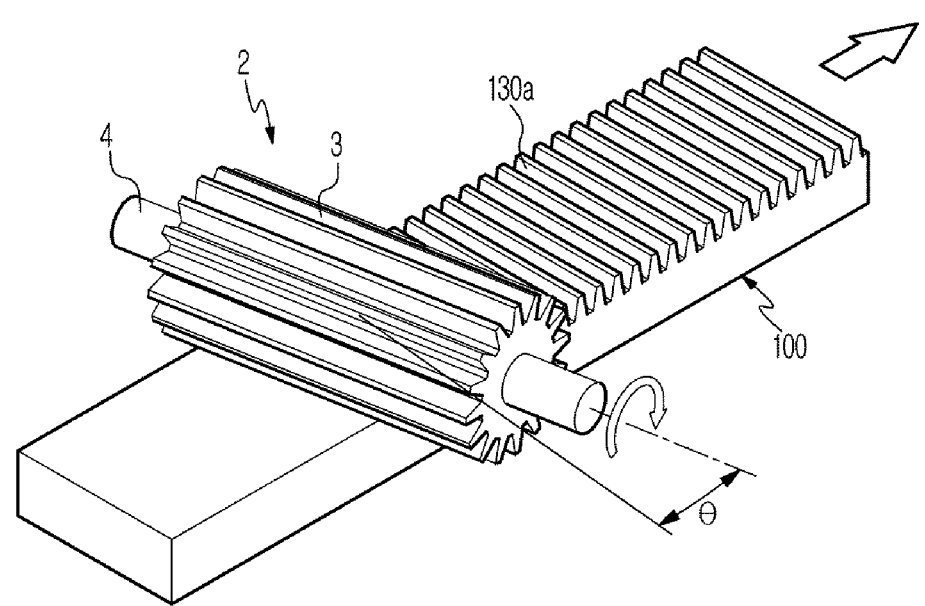
FIG. 3 is a diagram illustrating a state in which the axis of a hairline processing wheel for processing a hairline on a base material is tilted according to an embodiment of the present disclosure.

FIG. 3 is a diagram illustrating a state in which the axis of a hairline processing wheel for processing a hairline on a base material is tilted according to an embodiment of the present disclosure.

The hairline processing of the disclosed embodiment is performed using a hairline processing wheel 2. The polishing brush 3 for processing the hairline of the hairline processing wheel 2 uses a polishing brush 3 in which high-purity alumina ($Al_2O_3$: purity 90% or more) is adhered to the actual surface of Nylon6.6 or polyester through an adhesive.

The hairline processing wheel 2 according to the disclosed embodiment processes the hairline while tilted at a predetermined angle. The rotation shaft 4 of the hairline processing wheel 2 is installed to be tilted at a predetermined angle with respect to the short side of the base material 100. Accordingly, the polishing brush 3 of the hairline processing wheel 2 is also tilted at a predetermined angle. The polishing brush 3 of the hairline processing wheel 2 may be tilted 4 to 10° with respect to the horizontal plane. That is, θ described in FIG. 3 may be 4 to 10°. As in the disclosed embodiment, since the hairline is processed in the transverse direction as the base material moves, a centrifugal force acts on the base material 100. Accordingly, it was difficult to form a transverse hairline due to the centrifugal force of the hairline processing wheel 2 acting on the base material 100. Conventionally, the hairline was processed without tilting hairline processing wheel, and accordingly, the hairline was created in the diagonal direction. However, in the case of the disclosed embodiment, since the hairline processing wheel is tilted by 4 to 10° to process the hairline, the unevenness 130*a* forming the hairline may be formed to have an angle of 87 to 93° with respect to the vertical line. Accordingly, even if the base material 100 moves and processes the hairline, the hairline may be formed to have a transverse direction.

In addition, the pressure applied to the plating layer during hairline processing may be less than 1 to 1.40 A. The amount of wear of the chrome plating layer may be controlled by adjusting the hairline processing pressure. In the case of the disclosed embodiment, by adjusting the pressure applied to the plating layer during hairline processing to 1 to 1.40A, the chromium plating layer may be worn by 0.08 to 0.20 μm. Accordingly, the glossinessiness of the home appliance may be adjusted. This will be described later in Examples.

Figure 4:
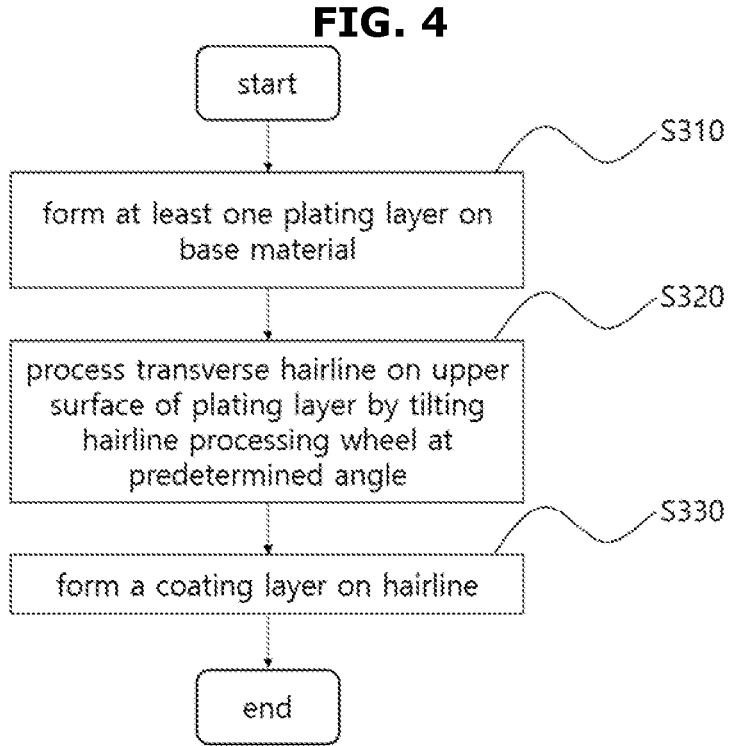
FIG. 4 is a flowchart illustrating a manufacturing process of a home appliance including a hairline according to an embodiment of the present disclosure.

FIG. 4 is a flowchart illustrating a manufacturing process of a home appliance according to an embodiment of the present disclosure.

As shown in FIG. 4, the home appliance of an embodiment of the disclosure is manufactured by forming at least one plating layer on the base material (S310), processing the transverse hairline on the upper surface of the plating layer by tilting the hairline processing wheel at a predetermined angle (S320), and forming a coating layer on the hairline (S330).

At least one plating layer is formed on the base material (S310). In this case, the base material may be aluminum (Al). Aluminum may be prepared by extrusion techniques. The base material may be 5 to 20 mm. The plating layer formed on the base material may be a copper plating layer, a nickel plating layer, or a chromium plating layer. In this case, the thickness of the copper plating layer may be 5 to 30 μm, the thickness of the nickel plating layer may be 5 to 30 μm, and the thickness of the chromium plating layer may be 0.3 to 0.8 μm. When plating the chromium plating layer, the current density is 10 A/dm$^2$, and the plating time may be 180 to 480 seconds.

The hairline in the transverse direction on the upper surface of the plating layer is processed by tilting the hairline processing wheel at a predetermined angle (S320). Hairline processing may be performed on the top surface of the chrome plating layer. At this time, the hairline processing wheel may be tilted 4° to 10° with respect to the horizontal plane. In addition, the pressure applied by the hairline processing wheel to the plating layer may be 1 to 1.4 A. According to the disclosed embodiment, the pressure applied by the hairline processing wheel to the plating layer before hairline processing may be 1.20 A, and the pressure applied by the hairline processing wheel to the plating layer after hairline processing may be 1.30 A. In addition, the rotational speed of the polishing brush may be 1000 to 1750 rpm. In addition, the supply rate of the base material may be 3.0 Hz.

A coating layer is formed on the hairline (S330). At this time, the paint used to form the coating layer may be fluorine-based, silane-based, or acrylic-based. In the case of a fluorine-based paint, polytetrafluoroethlene (PTFE) series may be used. In addition, in the case of acrylic paints, poly(methymethacrylate) (PMMA) series may be used. In the case of a silane type, a cyclo alkoxy alkyl silane may be used. Cyclo alkoxy alkyl silane contains a polyfunctional acrylic silane having lipophilic and hydrophobic properties, and may increase adhesion to the chromium plating layer. Coating of the coating layer may be performed using at least one of spray, dipping, wiping, and bar coating within 1 hour at room temperature. After that, room temperature curing or thermal curing is performed. In the case of acrylic paints, the thickness of the coating layer may be coated to a thickness of 10 μm or less. In the case of fluorine-based and silane-based paints, the thickness of the coating layer may be coated to 500 nm or less.

Hereinafter, a disclosed embodiment will be described through an experiment conducted on a home appliance according to the disclosed embodiment.

For the measurement of corrosion resistance, aluminum was used as the base material of Comparative Examples and Inventive Examples, and a copper plating layer, a nickel plating layer, and a chrome plating layer are located on the aluminum. The thickness of aluminum as the base material is 20 mm, the thickness of the copper plating layer is 15 μm, and the thickness of the nickel plating layer is 7 μm. The thickness of the chromium plating layer is different as described in [Table 1] in each of the comparative examples and Inventive examples. The hairline is processed on top of the chrome plating layer. At this time, the pressure applied to the base material during hairline processing is different as described in [Table 1] in each of the Comparative Examples and Inventive Examples. A corrosion resistance test was performed on the base material processed as described above. The corrosion resistance test is conducted by spraying 5% sodium chloride (NaCl) at 35° C. for 8 hours and then stopping for 16 hours three times, washing with water at room temperature, and visually determining whether there is rust or corrosion.

In Comparative Example 1-1, the thickness of the chromium plating layer is 0.12 μm, and the pressure applied to the base material during hairline processing is 1.40 A. In Comparative Example 1-2, the thickness of the chromium plating layer is 0.12 μm, and the pressure applied to the base material during hairline processing is 1.30 A.

In Comparative Example 1-3, the thickness of the chromium plating layer is 0.19 μm, and the pressure applied to the base material during hairline processing is 1.40 A.

In Comparative Example 1-4, the thickness of the chromium plating layer is 0.19 μm and the pressure applied to the base material during hairline processing is 1.30 A.

In Inventive Example 1-1, the thickness of the chromium plating layer is 0.33 μm, and the pressure applied to the base material during hairline processing is 1.30 A.

In Inventive Example 1-2, the thickness of the chromium plating layer is 0.33 μm, and the pressure applied to the base material during hairline processing is 1.20 A. In Inventive Example 1-3, the thickness of the chromium plating layer is 0.56 μm, and the pressure applied to the base material during hairline processing is 1.30 A.

In Inventive Example 1-4, the thickness of the chromium plating layer is 0.56 μm, and the pressure applied to the base material during hairline processing is 1.20 A.

TABLE 1

|  | thickness of chromium plating layer (um) | hairline processing pressure (A) | amount of wear of chrome plating layer (um) | Chrome plating layer thickness after hairline (um) | corrosion resistance (3 cycle) |
|---|---|---|---|---|---|
| Comparative Example 1-1 | 0.12 | 1.40 | 0.12 | Not measurable | NG |
| Comparative Example 1-2 | 0.12 | 1.30 | 0.11 | Not measurable | NG |
| Comparative Example 1-3 | 0.19 | 1.40 | 0.14 | Not measurable | NG |
| Comparative Example 1-4 | 0.19 | 1.30 | 0.16 | Not measurable | NG |
| Inventive Example 1-1 | 0.33 | 1.30 | 0.18 | 0.15 | PASS |
| Inventive Example 1-2 | 0.33 | 1.20 | 0.09 | 0.24 | PASS |
| Inventive Example 1-3 | 0.56 | 1.30 | 0.19 | 0.37 | PASS |
| Inventive Example 1-4 | 0.56 | 1.20 | 0.08 | 0.48 | PASS |

As shown in [Table 1], in the case of Comparative Example 1-1 and Comparative Example 1-3, the thickness of the chromium plating layer was thinner than that of the disclosed embodiment, and the hairline processing pressure was excessively large, so that the corrosion resistance test was not passed. In the case of Comparative Examples 1-2 and 1-4, the hairline processing pressure satisfies the range of the disclosed embodiment, but the thickness of the chromium plating layer was thin, so the corrosion resistance test was not passed.

In contrast, in the case of Inventive Examples 1-1 to 1-4, since the range of the chrome plating layer and the hairline processing pressure is within the range of the disclosed embodiment, it can be confirmed that the corrosion resistance test has passed. In addition, in the case of Inventive Examples 1-1 to 1-4, since the range of the chromium plating layer and the hairline processing pressure is within The sensory test is conducted by examining the visibility rate by 5 people compared to the bare sample at 800 lux lighting.

In Comparative Example 2-1, the hairline processing pressure is 1.50 A.

In Comparative Example 2-2, the hairline processing pressure is 1.40 A.

In Inventive Example 2-1, the hairline processing pressure is 1.35 A.

In Inventive Example 2-2, the hairline processing pressure is 1.30 A.

In Inventive Example 2-3, the hairline processing pressure is 1.30 A.

In Inventive Example 2-4, the hairline processing pressure is 1.25 A.

TABLE 2

| | thickness of chromium plating layer (μm) | hairline processing pressure (A) | fingerprint visibility | | | corrosion resistance (3cycle) |
|---|---|---|---|---|---|---|
| | | | glossiness | color difference (ΔE) | sensory test | |
| Comparative Example 2-1 | 0.42 | 1.50 | 71 | 4.02 | bad | NG |
| Comparative Example 2-2 | 0.42 | 1.40 | 123 | 3.81 | good | NG |
| Inventive Example 2-1 | 0.42 | 1.35 | 159 | 3.57 | good | PASS |
| Inventive Example 2-2 | 0.42 | 1.30 | 203 | 3.31 | good | PASS |
| Inventive Example 2-3 | 0.42 | 1.30 | 226 | 3.35 | good | PASS |
| Inventive Example 2-4 | 0.42 | 1.25 | 248 | 3.44 | good | PASS | the range of the disclosed embodiment, it can be confirmed that the thickness of the chromium plating layer after hairline processing is within 0.15 to 0.5 μm and has high corrosion resistance.

In the following, glossiness, color difference, and sensory tests were conducted to measure anti-fingerprint properties, the corrosion resistance test was conducted along with this.

Aluminum was used as the base material of Comparative Examples and Inventive Examples, and a copper plating layer, a nickel plating layer, and a chromium plating layer were positioned on the aluminum. The thickness of aluminum as the base material is 20 mm, the thickness of the copper plating layer is 15 μm, and the thickness of the nickel plating layer is 7 μm. The thickness of the chromium plating layer is 0.42 μm. The hairline processing pressure is different as described in [Table 2] in each of the comparative examples and Inventive Examples. Anti-fingerprint properties test was performed on the base material processed as described above. The glossiness of the anti-fingerprint properties test is measured by using BYK-Gardner GmbH's Cat No. 4447. The color difference is calculated using the following equation (1), and is obtained by measuring ΔE 5 times through a basic measurement method using the Konica Minolta's Minolta CM 2600D as a color difference meter, and by calculating the average of the median value after removing the maximum and minimum values.

$$\Delta E^* ab = \left[ (\Delta L^*)^2 + (\Delta a^*)^2 + (\Delta b)^2 \right]^{\frac{1}{2}} \quad \text{equation (1)}$$

As can be seen in [Table 2], in the case of Comparative Example 2-1 and Comparative Example 2-2, the hairline processing pressure was out of the range of the disclosed embodiment, and glossiness was found to be less than 150. Accordingly, Comparative Example 2-1 had a large color difference and did not pass the sensory test. Comparative Example 2-2 did not pass the corrosion resistance test due to excessive hairline processing pressure.

In the case of Inventive Examples 2-1 to 2-4, the hairline processing pressure was 1.20 to 1.35, the glossiness was 150 to 250, the color difference was small, the sensory test was passed, and the corrosion resistance test was also passed.

The following is a test conducted with hairline angle, hairline thickness, and sensory test according to the tilting angle of the hairline processing wheel. Aluminum was used as the base material of Comparative Example and Inventive Example, and a copper plating layer, a nickel plating layer, and a chromium plating layer were positioned on the aluminum. The thickness of aluminum as the base material is 20 mm, the thickness of the copper plating layer is 15 μm, and the thickness of the nickel plating layer is 7 μm. The thickness of the chromium plating layer is 0.42 μm. The hairline processing pressure is 1.30 A. The moving speed and tilting angle of the hairline processing wheel are different as described in [Table 3] in each of the Comparative Examples and Inventive Examples. A sensory test was performed on the base material processed as described above. The sensory test is conducted by examining the visibility rate by 5 people compared to the bare sample at 800 lux lighting.

In Comparative Example 3-1, the moving speed of the hairline processing wheel is 1000 rpm, and the hairline processing wheel is not tilted.

In Comparative Example 3-2, the moving speed of the hairline processing wheel is 1450 rpm, and the hairline processing wheel is not tilted.

In Comparative Example 3-3, the moving speed of the hairline processing wheel is 1750 rpm, and the hairline processing wheel is not tilted.

In Comparative Example 3-4, the moving speed of the hairline processing wheel is 1000 rpm, and the hairline processing wheel is tilted 2° in the z-axis direction.

In Comparative Example 3-5, the moving speed of the hairline processing wheel is 1000 rpm, and the hairline processing wheel is tilted 15° in the z-axis direction.

In Inventive Example 3-1, the moving speed of the hairline processing wheel is 1000 rpm, and the hairline processing wheel is tilted 4° in the z-axis direction.

In Inventive Example 3-2, the moving speed of the hairline processing wheel is 1000 rpm, and the hairline processing wheel is tilted 6° in the z-axis direction.

In Inventive Example 3-3, the moving speed of the hairline processing wheel is 1000 rpm, and the hairline processing wheel is tilted 8° in the z-axis direction.

In Inventive Example 3-4, the moving speed of the hairline processing wheel is 1000 rpm, and the hairline processing wheel is tilted 10° in the z-axis direction.

the z-axis direction so that the hairline angle is 87° to 93°, and the hairline is formed in the transverse direction. Accordingly, it passed the sensory test.

The following is a test that examines fingerprint visibility and wipeability according to the composition of the coating layer. Aluminum was used as the base material of Comparative Example and Inventive Example, and a copper plating layer, a nickel plating layer, and a chromium plating layer were positioned on the aluminum. The thickness of aluminum as the base material is 20 mm, the thickness of the copper plating layer is 15 μm, and the thickness of the nickel plating layer is 7 μm. The thickness of the chromium plating layer is 0.2 μm. The hairline processing pressure is 1.3 A. The coating conditions and the paint used for the coating layer are different as described in [Table 4] below. The moving speed and tilting angle of the hairline processing wheel are different as described in [Table 3] in each of the Comparative Examples and Inventive Examples. The anti-fingerprint properties test was performed on the base material processed as described above. Fingerprint visibility test and fingerprint wipeability test were conducted as anti-fingerprint properties test. The glossiness of the fingerprint visibility test is measured by using BYK-Gardner GmbH's Cat No. 4447. The color difference is calculated using the

TABLE 3

| | moving direction | tilting angle (°) | | | | | |
|---|---|---|---|---|---|---|---|
| | speed (rpm) | X axis | Y axis | Z axis | hairline angle (°) | hairline thickness (μm) | sensory test |
| Comparative Example 3-1 | 1000 | 0 | 0 | 0 | 105 | 20 | Bad |
| Comparative Example 3-2 | 1450 | 0 | 0 | 0 | 108 | 20 | Bad |
| Comparative Example 3-3 | 1750 | 0 | 0 | 0 | 115 | 20 | Bad |
| Comparative Example 3-4 | 1000 | 0 | 0 | 2 | 98 | 20 | Bad |
| Comparative Example 3-5 | 1000 | 0 | 0 | 15 | 80 | 20 | Bad |
| Inventive Example 3-1 | 1000 | 0 | 0 | 4 | 93 | 20 | Good |
| Inventive Example 3-2 | 1000 | 0 | 0 | 6 | 91 | 20 | Good |
| Inventive Example 3-3 | 1000 | 0 | 0 | 8 | 90 | 20 | Good |
| Inventive Example 3-4 | 1000 | 0 | 0 | 10 | 88 | 20 | Good |

As can be seen in [Table 3], in Comparative Examples 3-1 to 3-3, the hairline processing wheel was not tilted, so the hairline angle was 100° or more, and the hairline was formed as a diagonal line. Accordingly, Comparative Examples 3-1 to 3-3 did not pass the sensory test. In Comparative Example 3-4, the hairline processing wheel is slightly tilted. The hairline angle was 98°, and the hairline was formed close to the diagonal line as in Comparative Example 3-1 to Comparative Example 3-3, so the sensory test was not passed. In Comparative Example 3-5, the tilting of the hairline processing wheel is 15°, and the tilting of the hairline processing wheel is excessive, and it can be seen that the hairline angle is formed at 80° and formed as a diagonal line.

In the case of Inventive Examples 3-1 to 3-4, it can be seen that the hairline processing wheel is tilted 4° to 10° in following equation (1), and is obtained by measuring ΔE 5 times through a basic measurement method using the Konica Minolta's Minolta CM 2600D as a color difference meter, and by calculating the average of the median value after removing the maximum and minimum values.

$$\Delta E^* ab = \left[ (\Delta L^*)^2 + (\Delta a^*)^2 + (\Delta b)^2 \right]^{\frac{1}{2}} \qquad \text{equation (1)}$$

Fingerprint wipeability test measures glossiness and color difference after wiping three times with 500 g cotton cloth with a wear-resistant tester. The measurement method is as described above. In addition, the sensory test of the fingerprint wipeability test is conducted by inspecting the visibility rate by 5 people compared to the bare sample at 800 lux lighting.

The Inventive Example 4-1 uses a silane 1 component and is coated with 50 nm. In addition, it was cured at 25° C. by natural curing. Here, the silane 1 component refers to cyclohexyl methoxy dimethyl silane 1.

The Inventive Example 4-8 uses a fluorine 3 component and is coated with 200 nm. In addition, it was also UV cured. Here, the fluorine 3 component refers to perfluoro polyether 3.

The Inventive Example 4-9 uses an acrylic component 3 and is coated with 5000 nm. In addition, it was cured at 60° C. by thermal curing. Here, the acrylic component 3 refers to polyurethane mathacrylate.

[표 4]

| | anti-fingerprint coating | | | fingerprint visibility | | fingerprint wipeability | | |
| | | | | | color | | color | |
| component | Thickness (nm) | Curing method | glossiness (60°) | difference (ΔE) | glossiness (60°) | difference (ΔE) | sensory test |
|---|---|---|---|---|---|---|---|---|
| Inventive Example 4-1 | silane 1 | 50 | natural curing (25° C.) | 180 | 2.83 | 155 | 1.27 | PASS |
| Inventive Example 4-2 | fluorine 1 | 200 | UV curing | 180 | 3.04 | 141 | 1.49 | PASS |
| Inventive Example 4-3 | acrylic 1 | 5000 | thermal curing (60° C.) | 180 | 2.23 | 170 | 1.11 | PASS |
| Inventive Example 4-4 | silane 2 | 50 | natural curing (25° C.) | 200 | 3.31 | 179 | 1.32 | PASS |
| Inventive Example 4-5 | fluorine 2 | 200 | UV curing | 200 | 3.52 | 166 | 1.52 | PASS |
| Inventive Example 4-6 | acrylic 2 | 5000 | thermal curing (60° C.) | 200 | 2.50 | 189 | 1.18 | PASS |
| Inventive Example 4-7 | silane 3 | 50 | natural curing (25° C.) | 240 | 3.44 | 250 | 1.53 | PASS |
| Inventive Example 4-8 | fluorine 3 | 200 | UV curing | 240 | 3.74 | 250 | 1.85 | PASS |
| Inventive Example 4-9 | acrylic 3 | 5000 | thermal curing (60° C.) | 240 | 2.88 | 250 | 1.24 | PASS |

The Inventive Example 4-2 uses a fluorine 1 component and is coated with 200 nm. In addition, it was also UV cured. Here, the fluorine 1 component refers to perfluoro polyether 1.

The Inventive Example 4-3 uses an acrylic component 1 and is coated with 5000 nm. In addition, it was cured at 60° C. by thermal curing. Here, the acrylic component 1 refers to PMMA-co-PTMSM copolymer.

The Inventive Example 4-4 uses a silane 2 component and is coated with 50 nm. In addition, it was cured at 25° C. by natural curing. Here, the silane 2 component refers to cyclohexyl methoxy dimethyl silane 2.

The Inventive Example 4-5 uses a fluorine 2 component and is coated with 200 nm. In addition, it was also UV cured. Here, the fluorine 2 component refers to perfluoro polyether 2.

The Inventive Example 4-6 uses an acrylic component 2 and is coated with 5000 nm. In addition, it was cured at 60° C. by thermal curing. Here, the acrylic component 2 refers to PMMA-polysisesquioxane.

The Inventive Example 4-7 uses a silane 3 component and is coated with 50 nm. In addition, it was cured at 25° C. by natural curing. Here, the silane 3 component refers to cyclohexyl methoxy dimethyl silane 3.

As can be seen in [Table 4], when a fluorine-based, acrylic-based, or silane-based paint is used, the color difference in fingerprint visibility is 2 to 4, and the color difference in fingerprint wipeability is 1 to 2, which is not largely generated. Accordingly, it can be confirmed that the sensory test has also passed.

Figure 5:
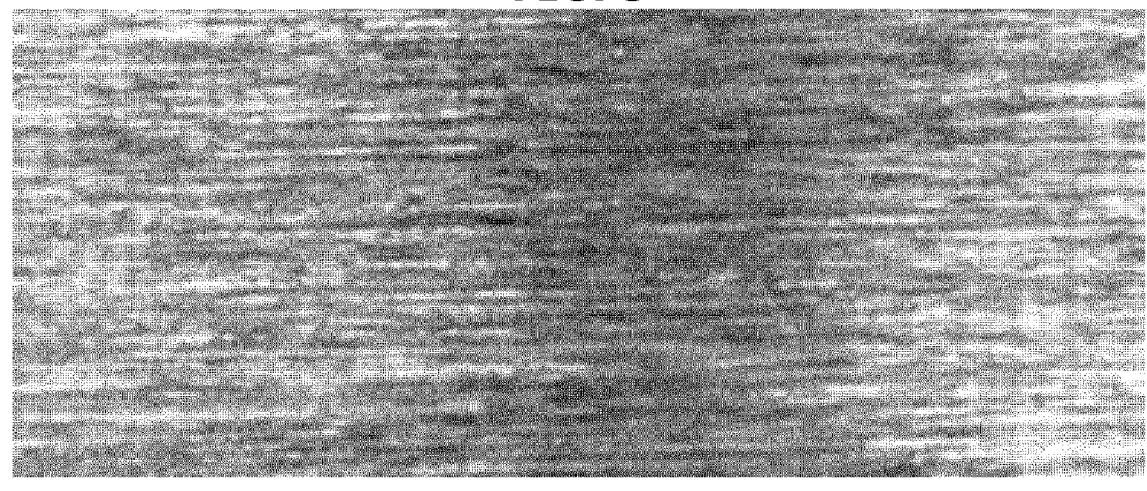
FIG. 5 is a photograph of a hairline formed according to an embodiment of the present disclosure.

FIG. 5 is a photograph of a hairline formed according to an embodiment of the present disclosure.

The hairline of FIG. 5 was processed by plating a copper plating layer of 15 μm, a nickel plating layer of 7 μm, and a chromium plating layer of 0.42 μm on 20 mm of aluminum as a base material, tilting the tilting angle of the hairline processing wheel by 4° in the z-axis direction during hairline processing and applying a pressure of 1.30 A. In addition, as a coating paint, a coating paint containing 0.1 to 0.8% cyclohexyl(methoxy)(methyl)(phenyl)silane and 99.0 to 99.9% alcohol was used. The coating was cured at room temperature for 1 hour after spraying once reciprocating on the hairline-processed chromium plating layer using the above-described coating paint. As a result of photographing the hairline of the home appliance manufactured as described above, it can be seen that the hairline is processed in the transverse direction as shown in FIG. 5.

As described above, according to the disclosed embodiment, it is possible to process the hairline in the transverse direction and at the same time secure corrosion resistance and anti-fingerprint properties.

The embodiments described in the present specification and the configurations shown in the drawings are only preferred examples of the disclosure, and there may be various modified examples that may replace the embodiments and drawings of the present specification at the time of filing of the present application.

In addition, terms used in the present specification are used to describe the embodiments, and are not intended to limit and/or limit the disclosed invention. Singular expressions include plural expressions unless the context clearly indicates otherwise. In this specification, terms such as "comprise" or "include" are intended to designate the presence of features, numbers, steps, actions, components, parts, or a combination thereof described in the specification, but does not preclude the presence or addition of one or more other features or numbers, steps, actions, components, parts, or combinations thereof.

In the above, specific embodiments have been illustrated and described. However, it is not limited only to the above-described embodiments, and those of ordinary skill in the art to which the invention pertains will be able to perform various changes without departing from the gist of the technical idea of the invention described in the following claims.

What is claimed is:

1. A manufacturing method of a home appliance comprising a hairline, the manufacturing method comprises:
   forming at least one plating layer on a base material;
   processing a transverse hairline on an upper surface of the plating layer by tilting a hairline processing wheel at a predetermined angle; and forming a coating layer on the hairline,
   wherein the forming of the at least one plating layer comprises:
      forming a copper plating layer by plating copper (Cu) on the base material;
      forming a nickel plating layer by plating nickel (Ni) on the formed copper plating layer; and
      forming a chromium plating layer by plating chromium (Cr) on the formed nickel plating layer, and
      wherein the chromium layer is processed to be worn by 0.08 to 0.20 μm during the hairline processing.

2. The manufacturing method according to claim 1, wherein the tilting angle of the hairline processing wheel is 4° to 10°.

3. The manufacturing method according to claim 1, wherein the forming of the plating layer comprises:
   plating the copper plating layer to 5 to 30 μm;
   plating the nickel plating layer to 5 to 30 μm on an upper surface of the copper plating layer; and
   plating the chromium plating layer to 0.30 to 0.80 μm on an upper surface of the nickel plating layer.

4. The manufacturing method according to claim 1, wherein the base material is aluminum (Al).

5. The manufacturing method according to claim 1, wherein the coating layer is coated using one of acrylic, fluorine, and silane-based paints.

6. The manufacturing method according to claim 1, wherein the hairline is formed to form an angle of 87° to 93° with respect to a vertical line which is perpendicular to a short side of the base material.

* * * * *